(12) United States Patent
Makino et al.

(10) Patent No.: US 11,990,817 B2
(45) Date of Patent: May 21, 2024

(54) MOTOR AND DRIVE DEVICE

(71) Applicant: NIDEC CORPORATION, Kyoto (JP)

(72) Inventors: Takayuki Makino, Kyoto (JP); Masato Aono, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 36 days.

(21) Appl. No.: 17/848,396

(22) Filed: Jun. 24, 2022

(65) Prior Publication Data

US 2023/0006498 A1 Jan. 5, 2023

(30) Foreign Application Priority Data

Jun. 30, 2021 (JP) .................................. 2021-108488

(51) Int. Cl.
*H02K 5/04* (2006.01)
*H02K 1/12* (2006.01)
*H02K 1/22* (2006.01)
*H02K 7/00* (2006.01)

(52) U.S. Cl.
CPC ................. *H02K 5/04* (2013.01); *H02K 1/12* (2013.01); *H02K 1/22* (2013.01); *H02K 7/003* (2013.01)

(58) Field of Classification Search
CPC ........ H02K 11/01; H02K 11/02; H02K 11/40; H02K 5/04; H02K 1/12; H02K 1/22; H02K 7/003; H02K 1/32; H02K 9/19; H02K 1/278; H02K 5/10; H02K 5/16; H02K 7/116; H01R 4/64
See application file for complete search history.

(56) References Cited

U.S. PATENT DOCUMENTS

| 7,193,836 | B2 | 3/2007 | Oh et al. | |
| 9,859,672 | B2* | 1/2018 | Fukumoto | H02K 13/00 |
| 10,158,274 | B2* | 12/2018 | Sakai | H02K 11/40 |
| 11,088,582 | B2 | 8/2021 | Graves et al. | |
| 11,121,608 | B2 | 9/2021 | Huber et al. | |
| 2013/0057096 | A1 | 3/2013 | Okada et al. | |
| 2023/0006500 | A1* | 1/2023 | Shimogai | H02K 9/19 |

FOREIGN PATENT DOCUMENTS

| CN | 108173386 A | 6/2018 |
| JP | 2000316251 A | 11/2000 |
| JP | 2001157394 A | 6/2001 |

(Continued)

OTHER PUBLICATIONS

Makino et al.; "Motor";U.S. Appl. No. 17/676,819, filed Feb. 22, 2022, 73pp.

(Continued)

*Primary Examiner* — Thomas Truong
(74) *Attorney, Agent, or Firm* — HAUPTMAN HAM, LLP

(57) ABSTRACT

A shaft of a motor includes a first shaft and a second shaft extending from the first shaft to one axial side. A housing includes a neutralizing device holder that holds a first neutralizing device. The neutralizing device holder includes a seal holder that is arranged radially outward of the second shaft and holds a seal member. The first neutralizing device electrically connects the second shaft and the neutralizing device holder. The seal member seals a gap between the second shaft and the seal holder, and is arranged on the other axial side of the first neutralizing device.

16 Claims, 9 Drawing Sheets

(56) References Cited

FOREIGN PATENT DOCUMENTS

JP          20104695 A      1/2010
JP        2019192491 A     10/2019

OTHER PUBLICATIONS

Nakamura et al.; "Drive Device and Vehicle", U.S. Appl. No. 17/852,396, filed Jun. 29, 2022, 59pp.
Shimogai et al.; "Drive Device and Vehicle", U.S. Appl. No. 17/851,042, filed Jun. 28, 2022, 60pp.
Shiraishi et al.; "Drive Device and Vehicle", U.S. Appl. No. 17/852,367, filed Jun. 29, 2022, 66pp.

* cited by examiner

D2 ←——————→ D1

MOTOR AND DRIVE DEVICE

CROSS-REFERENCE TO RELATED APPLICATIONS

The present invention claims priority under 35 U.S.C. § 119 to Japanese Patent Application No. 2021-108488 filed on Jun. 30, 2021, the entire content of which is incorporated herein by reference.

FIELD OF THE INVENTION

The present invention relates to a motor and a drive device.

BACKGROUND

Conventionally, a neutralizing device that eliminates static electricity from a shaft of a motor of a drive device has been known. For example, a charge dissipating assembly, which serves as a neutralizing device, is arranged between a shaft and a housing of a motor and contacts a radially outer surface of the shaft to ground a shaft voltage.

However, if foreign matter adheres to the neutralizing device, the efficiency of eliminating the static electricity of the shaft by the neutralizing device may decrease. For example, in an in-vehicle drive device, a lubricating oil, a refrigerant for cooling a motor, and the like may adhere to a neutralizing device. At this time, there is a possibility that it becomes difficult to maintain good electrical conduction between a shaft and a housing due to a decrease in conductivity of the neutralizing device.

SUMMARY

An exemplary motor of the present invention includes a shaft, a rotor, a stator, a bearing, a housing, a first neutralizing device, and a seal member. The shaft includes a first shaft axially extending along a rotation axis. The rotor is fixed to the shaft and is rotatable about the rotation axis. The stator radially faces the rotor with a gap interposed therebetween. The bearing rotatably supports the shaft. The housing accommodates the rotor, the stator, and the bearing. The shaft further includes a second shaft. The second shaft extends to one axial side from the first shaft. The housing includes a bearing holder and a neutralizing device holder. The bearing holder has an opening through which the first shaft is inserted, and holds the bearing. The neutralizing device holder holds the first neutralizing device and covers at least a part of the opening. The neutralizing device holder includes a seal holder. The seal holder is arranged radially outward of the second shaft and holds the seal member. The first neutralizing device electrically connects the second shaft and the neutralizing device holder. The seal member seals a gap between the second shaft and the seal holder, and is arranged on the other axial side of the first neutralizing device.

An exemplary drive device of the present invention includes the motor and a power transmission device. The power transmission device transmits power of the motor to a drive shaft.

The above and other elements, features, steps, characteristics and advantages of the present disclosure will become more apparent from the following detailed description of the preferred embodiments with reference to the attached drawings.

DETAILED DESCRIPTION

Hereinafter, an exemplary preferred embodiment will be described with reference to the drawings.

Figure 1:
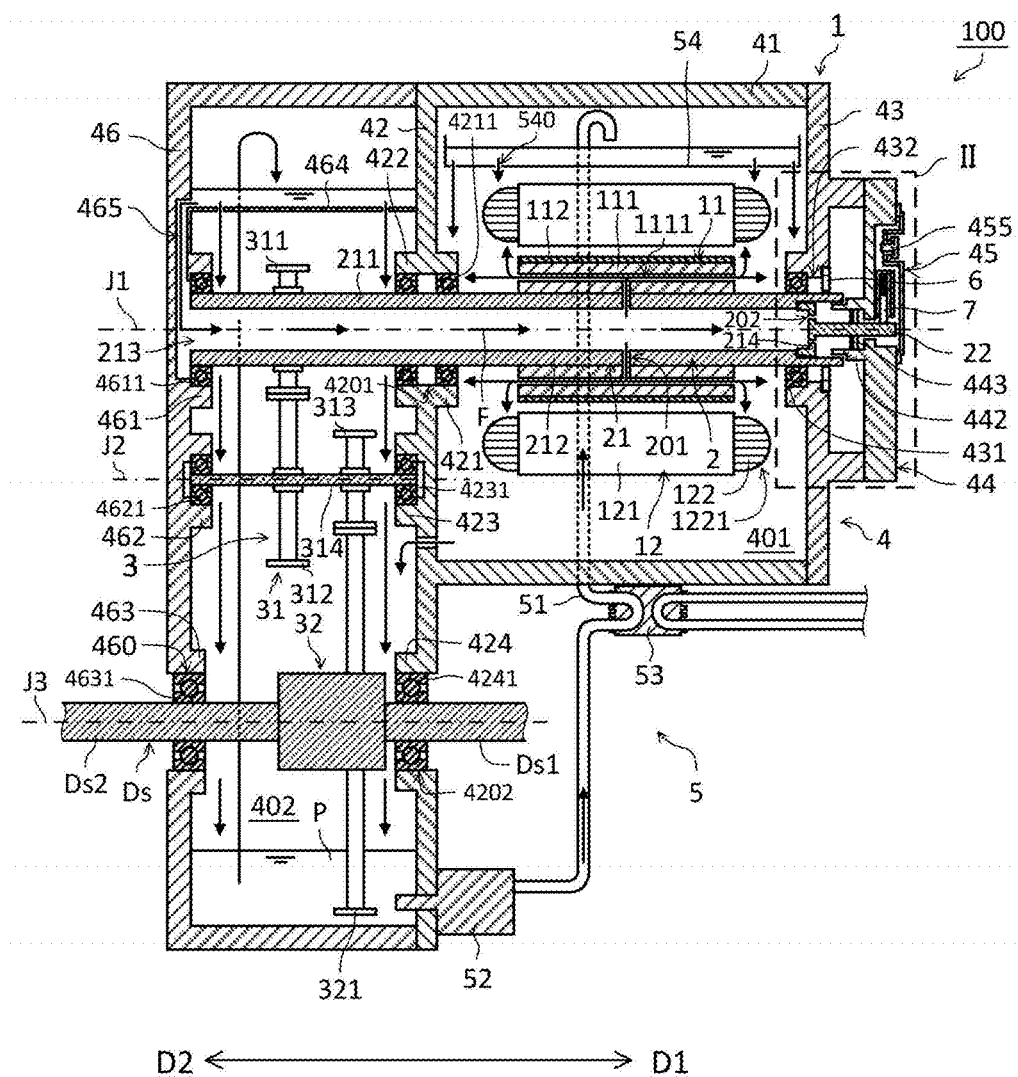
FIG. 1 is a conceptual diagram illustrating a configuration example of a drive device.

In the present specification, a direction parallel to a rotation axis J1 of a motor 1 is referred to as an "axial direction" of a drive device 100. In the axial direction, as illustrated in FIG. 1, the motor 1 side is referred to as one axial side D1, and a power transmission device 3 side is defined as the other axial side D2. In addition, a radial direction orthogonal to a predetermined axis is simply referred to as a "radial direction", and a circumferential direction around the predetermined axis is simply referred to as a "circumferential direction". The "direction parallel to the rotation axis" described in the present specification includes not only a case where the direction is completely parallel to the rotation axis, but also a case where the direction is substantially parallel to the rotation axis. Then, "extending along" a predetermined direction or a plane includes not only a case of extending strictly in a predetermined direction but also a case of extending in a direction inclined within a range of less than 45° with respect to the exact direction.

Figure 2:
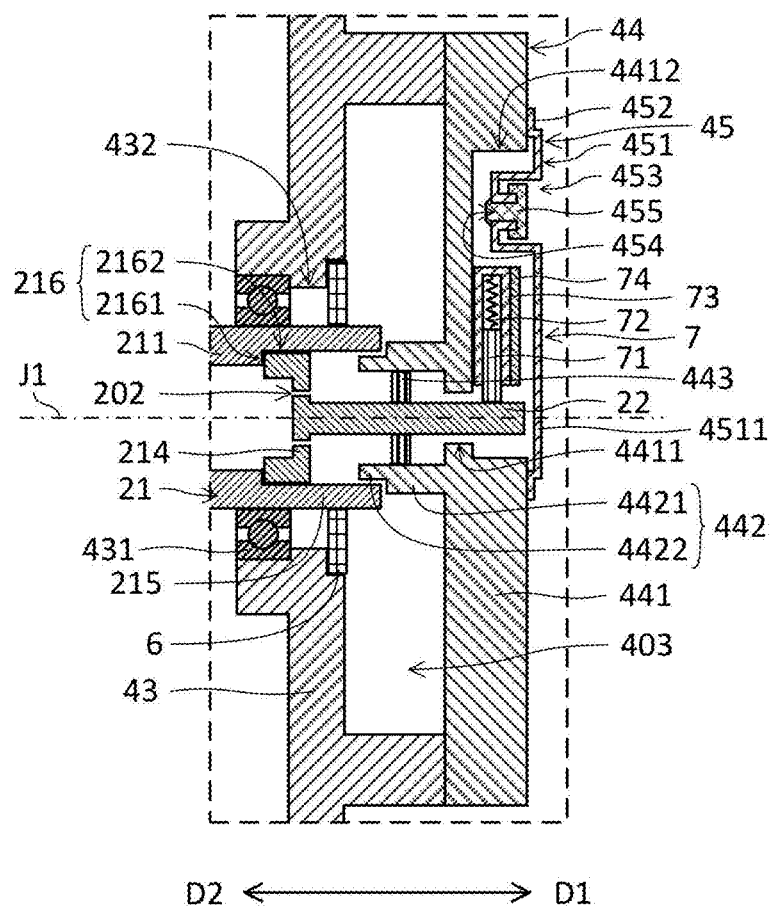
FIG. 2 is a conceptual diagram illustrating an enlarged configuration example of main parts of the drive device according to the preferred embodiment.
Figure 3:
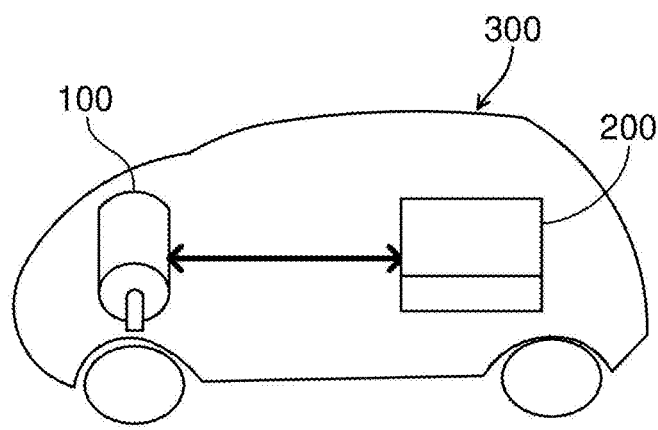
FIG. 3 is a schematic diagram illustrating an example of a vehicle having the drive device mounted thereon.

FIG. 1 is a conceptual diagram illustrating a configuration example of the drive device 100. FIG. 2 is a conceptual diagram illustrating an enlarged configuration example of main parts of the drive device 100 according to the preferred embodiment. FIG. 3 is a schematic diagram illustrating an example of a vehicle 300 having the drive device 100 mounted thereon. Note that FIGS. 1 and 2 are merely conceptual diagrams, and the arrangement and dimensions of each portion are not necessarily the same as those of the actual drive device 100. In addition, FIG. 2 is an enlarged view of a portion II surrounded by a broken line in FIG. 1. In addition, FIG. 3 conceptually illustrates the vehicle 300.

In the present preferred embodiment, the drive device 100 is mounted on the vehicle 300 such as a hybrid vehicle (HV), a plug-in hybrid vehicle (PHV), or an electric vehicle (EV) in which at least the motor is used as a power source as illustrated in FIG. 3. The drive device 100 is used as the power source of the above-described vehicle 300. The vehicle 300 includes the drive device 100 and a battery 200. The battery 200 stores electric power to be supplied to the drive device 100. In the example of the vehicle 300, the drive device 100 drives right and left front wheels. Note that, the drive device 100 may drive at least any of the wheels.

As illustrated in FIG. 1, the drive device 100 includes the motor 1 and the power transmission device 3. The power transmission device 3 transmits the power of the motor 1 to a drive shaft Ds. According to the configuration of the drive device 100 to be described hereinafter, it is possible to favorably maintain electrical connection between a shaft 2 and a housing 4 of the motor 1. Therefore, electric corrosion caused by a current generated by potential fluctuations occurring in the shaft 2 of the motor 1 can be stably suppressed or prevented.

The motor 1 is a DC brushless motor. The motor 1 is a drive source of the drive device 100, and is driven by power from an inverter (not illustrated). As illustrated in FIG. 1, the motor 1 includes a rotor 11, a stator 12, the shaft 2, the housing 4, a fluid circulation portion 5, a rotation detector 6, and a first neutralizing device 7. Note that details of the housing 4 will be described later.

The rotor 11 is fixed to the shaft 2 and is rotatable about the rotation axis J1. Specifically, the rotor 11 is fixed to a radially outer surface of a first shaft 21 to be described later. The rotor 11 rotates when electric power is supplied from a power source unit (not illustrated) of the drive device 100 to the stator 12.

The rotor 11 includes a rotor core 111 and a magnet 112. The rotor core 111 is formed by laminating thin electromagnetic steel plates, for example. The rotor core 111 is a cylindrical body extending along the axial direction, and is fixed to the radially outer surface of the first shaft 21. A plurality of the magnets 112 are fixed to the rotor core 111. The plurality of magnets 112 are arranged along the circumferential direction with magnetic poles arranged alternately.

In addition, the rotor core 111 has a rotor through-hole 1111. The rotor through-hole 1111 penetrates the rotor core 111 in the axial direction and is connected to a first shaft through-hole 201. The rotor through-hole 1111 is used as a flow path of a fluid F. Note that the fluid F is a lubricant that lubricates each bearing of the drive device 100, the power transmission device 3, and the like, and is, for example, oil such as automatic transmission fluid (ATF) in the present preferred embodiment. The drive device 100 includes the fluid F. In addition, the fluid F is also used as a refrigerant for cooling the stator 12 and bearings 4211 and 431 to be described later, and the like.

When the rotor 11 rotates, the fluid F flowing through a hollow portion 212 of the first shaft 21 can flow into the rotor through-hole 1111 via the first shaft through-hole 201. In addition, the fluid F flowing into the rotor through-hole 1111 can flow out of the rotor core 111 from both axial ends of the rotor through-hole 1111. The fluid F having flowed out flies toward the stator 12 and cools, for example, a coil portion 122 (particularly, a coil end 1221 thereof) to be described later and the like. In addition, the fluid F having flowed out flies toward the bearings 4211 and 431 rotatably supporting the first shaft 21, and the like and lubricates and cools the bearings 4211 and 431.

The stator 12 faces the rotor 11 with a gap in the radial direction. The stator 12 is arranged radially outward of the rotor 11 and drives the rotor 11 to rotate. The motor 1 is an inner rotor type in which the rotor 11 is rotatably arranged radially inward of the stator 12.

The stator 12 includes a stator core 121 and the coil portion 122. The stator 12 is held by a first housing tubular portion 41 to be described later. The stator core 121 includes a plurality of magnetic pole teeth (not illustrated) extending radially inward from an inner peripheral surface of an annular yoke. The coil portion 122 is formed by winding a conductive wire around the magnetic pole teeth via an insulator (not illustrated). The coil portion 122 includes the coil end 1221 protruding from an axial end surface of the stator core 121.

The shaft 2 extends in the axial direction along the rotation axis J1. The shaft 2 supports the rotor 11 and is rotatable about the rotation axis J1. The shaft 2 is rotatably supported by the housing 4 via bearings 4211, 4221, 431, and 4611 to be described later. In the present preferred embodiment, each of the bearings 4211, 4221, 431, and 4611 is a ball bearing. However, types of the bearings 4211, 4221, 431, and 4611 are not limited to this example. For example, at most three of these may be other than the ball bearing (e.g., sliding bearings or the like).

The shaft 2 includes the first shaft 21, a second shaft 22, the first shaft through-hole 201, and second shaft through-holes 202. The first shaft 21 and the second shaft 22 have conductivity, and are made of metal in the present preferred embodiment.

The first shaft 21 has a tubular shape extending in the axial direction along the rotation axis J1. As described above, the shaft 2 includes the first shaft 21. The fluid F flows inside the first shaft 21. The fluid F can be supplied to and cool the stator 12, the bearings 4211 and 431, and the like through the first shaft through-hole 201 according to the rotation of the shaft 2.

Note that the first shaft 21 may be dividable at an intermediate portion in the axial direction. When the first shaft 21 is dividable, the divided first shafts 21 are connected by spline fitting, for example.

Alternatively, the divided first shafts 21 may be connected by screw coupling using a male screw and a female screw, or may be joined by a fixing method such as press-fitting or welding. When the fixing method such as press-fitting or welding is adopted, serrations combining recesses and protrusions extending in the axial direction may be adopted. With such a configuration, the rotation can be reliably transmitted between the divided first shafts 21.

The first shaft 21 includes a shaft tubular portion 211. The shaft tubular portion 211 extends in the axial direction and surrounds the rotation axis J1. In addition, the first shaft 21 further includes the hollow portion 212 and an inlet 213. The hollow portion 212 is a space surrounded by an inner peripheral surface of the shaft tubular portion 211, and is arranged inside the shaft tubular portion 211. The inlet 213 is an opening at an end portion on the other axial side D2 of the shaft tubular portion 211, and is connected to an oil passage 465 of a gear lid 46 to be described later. The fluid F flows into the hollow portion 212 from the oil passage 465 through the inlet 213.

Figure 4:
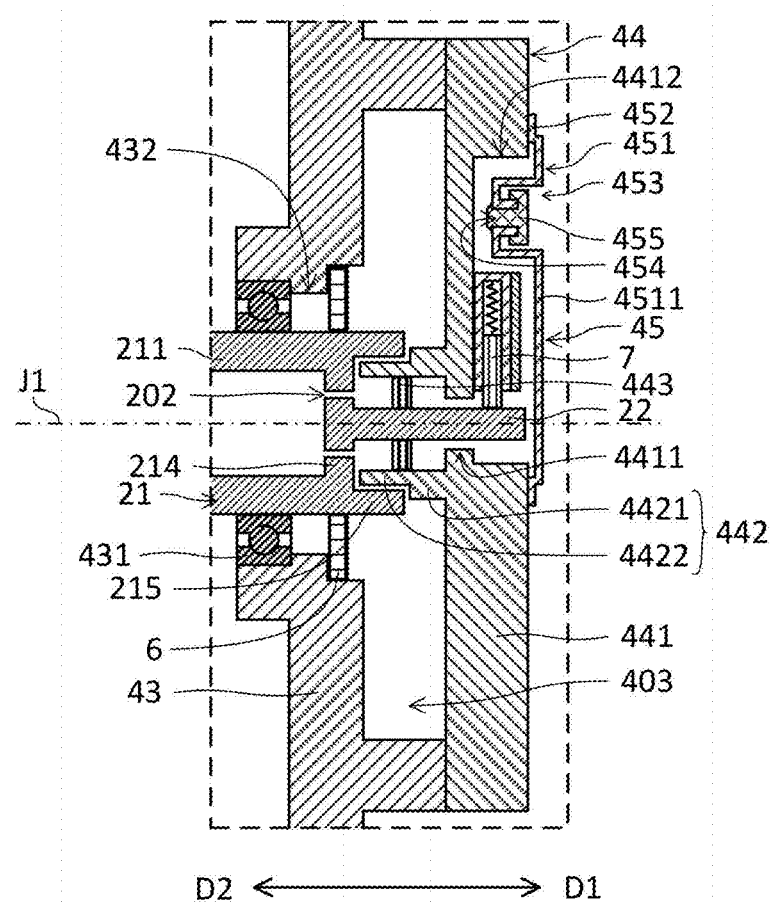
FIG. 4 is a schematic diagram illustrating another configuration example of a first shaft.

In addition, the first shaft 21 further includes a shaft lid 214. The shaft lid 214 is arranged on the one axial side D1 of the first shaft 21. The shaft lid 214 expands radially outward from the rotation axis J1. In the present preferred embodiment, the shaft lid 214 is a separate body from the first shaft 21 as illustrated in FIG. 2. However, the present invention is not limited to this example, and the shaft lid 214 may be integrated with the first shaft 21 (see FIG. 4).

In addition, the first shaft 21 preferably has a peripheral wall 215 having a tubular shape. The peripheral wall 215 protrudes to the one axial side D1 from an end portion on the one axial side D1 of the shaft tubular portion 211. A tip end portion of a seal holder 442 to be described later is inserted into the peripheral wall 215.

In addition, the first shaft 21 preferably has a step 216. The shaft lid 214 is fitted to the step 216. The step 216 is arranged on an inner peripheral surface of the first shaft 21 at an end portion on the one axial side D1 of the first shaft 21. The step 216 has a first facing surface 2161 and a second facing surface 2162. The first facing surface 2161 faces an end portion on the other axial side D2 of the shaft lid 214. The second facing surface 2162 expands from a radially outer end portion of the first facing surface 2161 to the one axial side D1 and faces a radially outer end portion of the shaft lid 214 in the radial direction. In the present preferred embodiment, the first facing surface 2161 expands radially outward from the inner peripheral surface of the shaft tubular portion 211. The second facing surface 2162 is a part of an inner peripheral surface of the peripheral wall 215. However, the present invention is not limited to this example, and the second facing surface 2162 may not be a part of the inner peripheral surface of the peripheral wall 215, and may be, for example, a part of the inner peripheral surface of the shaft tubular portion 211. Then, when the shaft 2 is assembled, the shaft lid 214 as the separate body from the first shaft 21 can be positioned with respect to the first shaft 21 by abutting the shaft lid 214 against the first facing surface 2161. Therefore, the workability of assembling the shaft 2 can be improved.

Note that the above-described example does not exclude a configuration in which the first shaft 21 does not include at least one of the peripheral wall 215 and the step 216.

The second shaft 22 extends from the first shaft 21 to the one axial side D1. In the present preferred embodiment, the second shaft 22 extends from the shaft lid 214 to the one axial side D1 along the rotation axis J1. An outer diameter of the second shaft 22 is smaller than an outer diameter of the first shaft 21 (shaft tubular portion 211), and is, for example, smaller than an inner diameter of the shaft tubular portion 211.

Figure 5A:
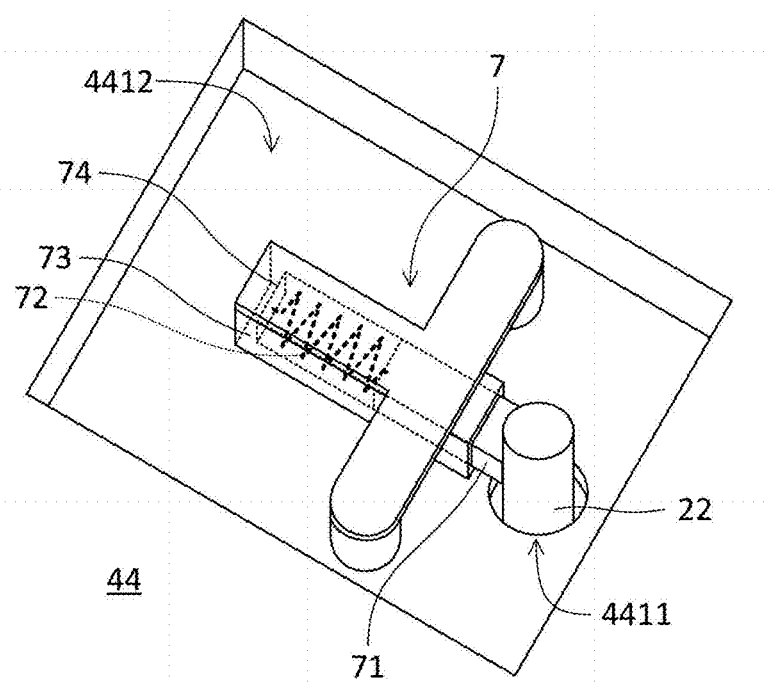
FIG. 5A is a diagram illustrating an example of contact between a second shaft and a first neutralizing device.
Figure 5B:
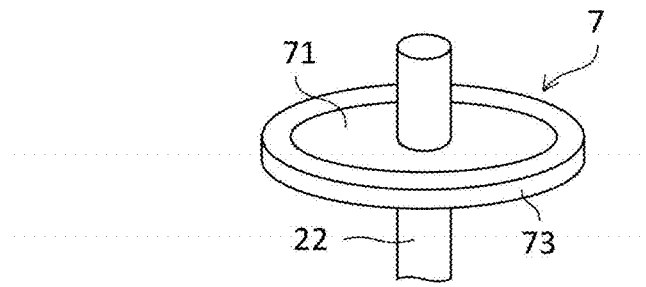
FIG. 5B is a diagram illustrating another example of the contact between the second shaft and the first neutralizing device.

The first neutralizing device 7 contacts the second shaft 22. FIG. 5A is a diagram illustrating an example of contact between the second shaft 22 and the first neutralizing device 7. FIG. 5B is a diagram illustrating another example of the contact between the second shaft 22 and the first neutralizing device 7. Preferably, the first neutralizing device 7 contacts at least a partial region in the circumferential direction of a radially outer surface of the second shaft 22 as illustrated in FIG. 5A. Then, it is unnecessary to secure a space for arranging the first neutralizing device 7 on the one axial side D1 of the second shaft 22, for example, as compared with a configuration in which the first neutralizing device 7 contacts an end portion on the one axial side D1 of the second shaft 22. Therefore, it is possible to suppress an increase in axial size of the motor 1, it is possible to contribute to downsizing of the motor 1 and the drive device 100.

Note that, when the first neutralizing device 7 contacts a partial region in the circumferential direction of the radially outer surface of the second shaft 22 as illustrated in FIG. 5A, it is possible to further reduce the sliding area of the first neutralizing device 7 with respect to the second shaft 22 when the shaft 2 rotates. Therefore, even if the first neutralizing device 7 is worn due to sliding, the amount of wear can be reduced, and the amount of generated wear debris can also be reduced.

In addition, when the first neutralizing device 7 contacts the entire region in the circumferential direction of the radially outer surface of the second shaft 22 as illustrated in FIG. 5B, it is possible to further widen the contact area of the first neutralizing device 7 with respect to the second shaft 22. Therefore, the electric resistance between the both can be further reduced, the neutralizing efficiency of the first neutralizing device 7 can be further improved.

The first shaft through-hole 201 penetrates the first shaft 21 in the radial direction. As described above, the shaft 2 has the first shaft through-hole 201.

Specifically, the first shaft through-hole 201 is arranged in the shaft tubular portion 211 and penetrates the shaft tubular portion 211 in the radial direction. When the shaft 2 rotates, the fluid F in the first shaft 21 flows out from the hollow portion 212 to the outside of the first shaft 21 through the first shaft through-hole 201 by the centrifugal force.

In the present preferred embodiment, the first shaft through-hole 201 is arranged on the other axial side D2 with respect to the end portion on the one axial side D1 of the rotor 11 and on the one axial side D1 with respect to the end portion on the other axial side D2 of the rotor 11 as illustrated in FIG. 1, and is connected to the rotor through-hole 1111 as described above.

However, the present invention is not limited to the example of FIG. 1, and at least one first shaft through-hole 201 may be arranged on the one axial side D1 with respect to the bearing 4211 and on the other axial side D2 with respect to the end portion on the other axial side D2 of the rotor 11. Alternatively, at least one first shaft through-hole 201 may be arranged on the one axial side D1 with respect to the end portion on the one axial side D1 of the rotor 11 and on the other axial side D2 with respect to the shaft lid 214. Then, the refrigerant (that is, the fluid F) flowing inside the shaft tubular portion 211 can directly flow out toward the stator 12, the bearings 4211 and 431, and the like through the at least one first shaft through-hole 201.

The second shaft through-hole 202 causes a space surrounded by the shaft tubular portion 211 and the shaft lid 214 to communicate with the outside of the shaft 2. As described above, the shaft 2 has the second shaft through-hole 202. For example, this space is located on the other axial side D2 of the shaft lid 214 in the hollow portion 212. The second shaft through-hole 202 is arranged on the one axial side D1 of the first shaft through-hole 201 and radially outward of the second shaft 22. Then, when the shaft 2 rotates, for example, the fluid F can be sucked from the second shaft through-hole 202 to be drawn into the first shaft 21 from the other axial side D2 due to a pressure difference. Therefore, it is possible to cool the stator 12 (particularly, the coil portion 122 thereof) by causing the fluid F inside the first shaft 21 having a tubular shape to flow out from the first shaft through-hole 201.

The number of the second shaft through-holes 202 may be one or plural. In the latter case, at least some of the second shaft through-holes 202 can be arranged at equal intervals or different intervals in the circumferential direction (see, for example, FIGS. 6A to 6C to be described later). In the present preferred embodiment, at least some of the second shaft through-holes 202 are arranged in the shaft lid 214 and penetrate the shaft lid 214 in the axial direction.

Figure 6A:
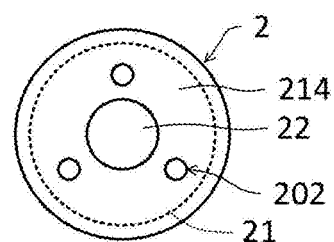
FIG. 6A illustrates a first arrangement example of second shaft through-holes in a shaft lid.
Figure 6B:
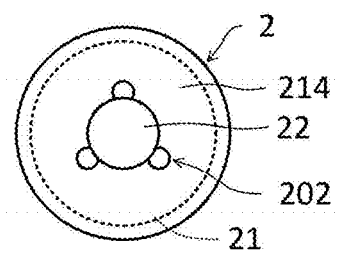
FIG. 6B illustrates a second arrangement example of the second shaft through-holes in the shaft lid.
Figure 6C:
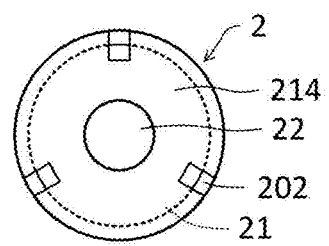
FIG. 6C illustrates a third arrangement example of the second shaft through-holes in the shaft lid.

FIG. 6A illustrates a first arrangement example of the second shaft through-holes 202 in the shaft lid 214. FIG. 6B illustrates a second arrangement example of the second shaft through-holes 202 in the shaft lid 214. FIG. 6C illustrates a third arrangement example of the second shaft through-holes 202 in the shaft lid 214. At least some of the second shaft through-holes 202 may be arranged between the radially outer end portion of the shaft lid 214 and the second shaft 22 in the radial direction (see FIG. 6A, for example). In addition, at least some of the second shaft through-holes 202 may be arranged along the radially outer surface of the second shaft 22 (see FIG. 6B, for example). In addition, at least some of the second shaft through-holes 202 may be arranged along the radially outer end portion of the shaft lid 214 (see FIG. 6C, for example). Further, the second shaft through-hole 202 arranged along the radially outer end portion of the shaft lid 214 may include a notch formed at the radially outer end portion of the shaft lid 214 and a notch formed at the end portion on the one axial side D1 of the first shaft 21.

Since at least some of the second shaft through-holes 202 are arranged in the shaft lid 214, air can be more easily sucked into the first shaft 21 than a case where the second shaft through-holes 202 are arranged in the first shaft 21. In addition, if the number of the second shaft through-holes 202 functioning as an intake port is plural, the amount of air sucked into the first shaft 21 and a flow of the sucked air flow can be appropriately adjusted according to the number and arrangement of the second shaft through-holes 202.

Alternatively, the fluid F flowing to the outside of the shaft lid 214 through the second shaft through-hole 202 can also be caused to flow from the inside to the outside of the first shaft 21 to be supplied to a seal member 443 to be described later. Here, in a case where synthetic rubber or the like is used for the seal member 443, there is a possibility that the surface is cured to cause cracking and the like if the surface is dried. Therefore, the fluid F is supplied to the seal member 443, so that it is possible to prevent the surface from being dried and to suppress cracking and the like caused by curing.

Therefore, the life of the seal member 443 can be extended.

However, the present invention is not limited to the above example, and the second shaft through-hole 202 may be arranged in the first shaft 21 and penetrate the first shaft 21 in the radial direction.

Next, details of the power transmission device 3 will be described with reference to FIG. 1. The power transmission device 3 is accommodated in a transmission device accommodation space 402, which will be described later, of the housing 4. The power transmission device 3 includes a deceleration device 31 and a differential device 32.

The deceleration device 31 is connected to the other axial side D2 of the first shaft 21. The deceleration device 31 has a function of reducing a rotation speed of the motor 1 to increase torque output from the motor 1 according to a reduction ratio. The deceleration device 31 transmits the torque output from the motor 1 to the drive shaft Ds.

The deceleration device 31 includes a main drive gear 311, an intermediate driven gear 312, a final drive gear 313, and an intermediate shaft 314. The torque output from the motor 1 is transmitted to a ring gear 321 of the drive shaft Ds via the shaft 2, the main drive gear 311, the intermediate driven gear 312, the intermediate shaft 314, and the final drive gear 313.

The main drive gear 311 is arranged on an outer peripheral surface of the shaft 2. The main drive gear 311 may be the same member as the shaft 2, or may be a separate member and be firmly fixed thereto. The main drive gear 311 rotates about the rotation axis J1 together with the shaft 2.

The intermediate shaft 314 extends along the intermediate axis J2 parallel to the rotation axis J1. Both ends of the intermediate shaft 314 are supported by a first intermediate bearing 4231 and a second intermediate bearing 4621 to be rotatable about an intermediate axis J2. The intermediate driven gear 312 and the final drive gear 313 are arranged on an outer peripheral surface of the intermediate shaft 314. The intermediate driven gear 312 may be the same member as the intermediate shaft 314, or may be a separate member and be firmly fixed thereto.

The intermediate driven gear 312 and the final drive gear 313 rotate integrally with the intermediate shaft 314 about the intermediate axis J2. The intermediate driven gear 312 meshes with the main drive gear 311. The final drive gear 313 meshes with the ring gear 321 of the drive shaft Ds.

The torque of the shaft 2 is transmitted from the main drive gear 311 to the intermediate driven gear 312. Then, the torque transmitted to the intermediate driven gear 312 is transmitted to the final drive gear 313 through the intermediate shaft 314. Further, the torque is transmitted from the final drive gear 313 to the drive shaft Ds.

The differential device 32 is attached to the drive shaft Ds. The differential device 32 has the ring gear 321. The ring gear 321 transmits the output torque of the motor 1 to the drive shaft Ds. The drive shaft Ds has drive shafts Ds1 and Ds2 respectively attached to the left and right of the differential device 32. For example, the differential device 32 transmits the torque to the left and right drive shafts Ds1 and Ds2 while absorbing a rotation speed difference between the left and right drive shafts when the vehicle turns.

Next, details of the housing 4 will be described. The housing 4 includes the first housing tubular portion 41, a side plate 42, a bearing holder 43, a neutralizing device holder 44, a cover member 45, and the gear lid 46. Note that the first housing tubular portion 41, the side plate 42, the bearing holder 43, the neutralizing device holder 44, the cover member 45, and the gear lid 46 are formed using, for example, a conductive material, and in the present preferred embodiment, are formed using a metal material such as iron, aluminum, or an alloy thereof. In addition, these are preferably formed using the same material in order to suppress contact corrosion of dissimilar metals at the contact portion. However, the present invention is not limited to this example, and these may be formed using materials other than the metal materials, or at least a part of these may be formed using different materials.

The housing 4 accommodates the rotor 11, the stator 12, the bearings 4211 and 431, and the like. Specifically, the housing 4 has a motor accommodation space 401 that accommodates these. The motor accommodation space 401 is a space surrounded by the first housing tubular portion 41, the side plate 42, and the bearing holder 43.

In addition, the housing 4 accommodates the power transmission device 3. Specifically, the housing 4 includes the transmission device accommodation space 402. The transmission device accommodation space 402 is a space surrounded by the side plate 42 and the gear lid 46, and accommodates the deceleration device 31, the differential device 32, and the like.

A fluid storage portion P in which the fluid F is stored is arranged in a lower portion in the transmission device accommodation space 402. The differential device 32 is partially arranged in the fluid storage portion P. The fluid F stored in the fluid storage portion P is scraped up by the operation of the differential device 32 and supplied to the inside of the transmission device accommodation space 402. For example, a lower end portion of the ring gear 321 is immersed in the fluid storage portion P. When the ring gear 321 rotates, the fluid F is scraped up by a tooth surface thereof. A part of the scraped fluid F is supplied to the respective gears and the respective bearings of the deceleration device 31 and the differential device 32 in the transmission device accommodation space 402 and used for lubrication and cooling. In addition, another part of the scraped fluid F is supplied to the inside of the shaft 2, and is supplied to the rotor 11 and the stator 12 of the motor 1 and the respective bearings in the transmission device accommodation space 402 to be used for cooling and lubrication.

The first housing tubular portion 41 has a tubular shape extending in the axial direction. The motor 1, a reservoir 54 to be described later, and the like are arranged inside the first housing tubular portion 41. In addition, the stator core 121 is fixed to an inner surface of the first housing tubular portion 41.

The side plate 42 expands in a direction perpendicular to the rotation axis J1 and covers an end portion on the other axial side D2 of the first housing tubular portion 41. In the present preferred embodiment, the first housing tubular portion 41 and the side plate 42 are different parts of the same member. Since the both are integrally formed, the rigidity of the both can be enhanced. However, the present invention is not limited to this example, and the first housing tubular portion 41 and the side plate 42 may be separate members.

The side plate 42 has a side plate through-hole 4201 through which the shaft 2 is inserted and a first drive shaft through-hole 4202. The side plate through-hole 4201 and the first drive shaft through-hole 4202 penetrates the side plate 42 in the axial direction. The first shaft 21 is inserted through the side plate through-hole 4201. One drive shaft Ds1 of the drive shaft Ds is inserted through the first drive shaft through-hole 4202. A seal portion (not illustrated) such as an oil seal for sealing between the drive shaft Ds1 and the first drive shaft through-hole 4202 is arranged in a gap therebetween.

Note that, the term "seal" means that different members are in close contact with each other to an extent that the fluid F inside the members does not leak to the outside and to an extent that foreign matter such as external water, dirt, or dust does not enter. It is assumed that the same is applied below for the sealing.

In addition, the term "close contact" means to have such a sealing property to an extent that the fluid F inside the members does not leak to the outside and to an extent that foreign matter such as external water, dirt, or dust does not enter. It is assumed that the same is applied below for the close contact.

In addition, the side plate 42 further includes bearing holding portions 421, 422, 423, and 424. The bearing holding portion 421 is arranged on an end surface on the one axial side D1 of the side plate 42 in the motor accommodation space 401 and holds the bearing 4211. The bearing holding portions 422, 423, and 424 are arranged on an end surface on the other axial side D2 of the side plate 42 in the transmission device accommodation space 402 to be described later. The bearing holding portion 422 is arranged along an outer edge of an end portion on the other axial side D2 of the side plate through-hole 4201 and holds the bearing 4211. The bearing holding portion 423 holds the first intermediate bearing 4231. The bearing holding portion 424 is arranged along an outer edge of an end portion on the other axial side D2 of the first drive shaft through-hole 4202 and holds a first output bearing 4241.

The bearing holder 43 holds the bearing 431. As described above, the housing 4 includes the bearing holder 43. The bearing 431 rotatably supports the shaft 2. The motor 1 includes the bearing 431.

The bearing holder 43 has an opening 432 through which the first shaft 21 is inserted. The opening 432 penetrates the bearing holder 43 in the axial direction. As illustrated in FIG. 2, the bearing holder 43 expands in a direction (for example, the radial direction) intersecting the rotation axis J1 and covers the end portion on the one axial side D1 of the first housing tubular portion 41.

The bearing holder 43 is attached to the end portion on the one axial side D1 of the first housing tubular portion 41. The bearing holder 43 can be fixed to the first housing tubular portion 41 by, for example, fixing with a screw. However, the present invention is not limited to this example, and methods (screwing, press-fitting, and the like) by which the bearing holder 43 can be firmly fixed to the first housing tubular portion 41 can be widely adopted. As a result, the bearing holder 43 can be brought into close contact with the end portion on the one axial side D1 of the first housing tubular portion 41.

The neutralizing device holder 44 expands in a direction intersecting the rotation axis J1, and is attached to an end portion on the one axial side D1 of the bearing holder 43. As described above, the housing 4 includes the neutralizing device holder 44. The neutralizing device holder 44 holds the first neutralizing device 7 and covers at least a part of the opening 432 of the bearing holder 43. In the present preferred embodiment, the first neutralizing device 7 is arranged on the one axial side D1 of the neutralizing device holder 44. The first neutralizing device 7 electrically connects the second shaft 22 and the neutralizing device holder 44. As a result, the current generated by the potential fluctuations occurring in the shaft 2 can be discharged to the housing 4 through the first neutralizing device 7.

In addition, the neutralizing device holder 44 includes a plate portion 441, the seal holder 442, and the seal member 443.

As illustrated in FIG. 2, the plate portion 441 expands in a direction (for example, the radial direction) intersecting the rotation axis J1. As described above, the neutralizing device holder 44 includes the plate portion 441. The plate portion 441 is attached to the end portion on the one axial side D1 of the bearing holder 43. The plate portion 441 forms a space 403 together with the bearing holder 43. A part of the shaft 2 (for example, the end portion on the one axial side D1 of the first shaft 21), the rotation detector 6, and the like are arranged in the space 403.

The plate portion 441 has an opening 4411 and a holder recess 4412. The opening 4411 penetrates the plate portion 441 in the axial direction. The second shaft 22 is inserted through the opening 4411. The holder recess 4412 is arranged at an end portion on the one axial side D1 of the neutralizing device holder 44 (particularly, the plate portion 441). That is, the neutralizing device holder 44 has the holder recess 4412. The holder recess 4412 is recessed to the other axial side D2. At least a part of the first neutralizing device 7 is accommodated in the holder recess 4412. Since at least a part of the first neutralizing device 7 is arranged in the holder recess 4412 arranged on the one axial side D1 of the neutralizing device holder 44, the first neutralizing device 7 can be arranged on the other axial side D2.

Therefore, the axial size of the motor 1 can be reduced, and the motor 1 and the drive device 100 can be further downsized.

Figure 7:
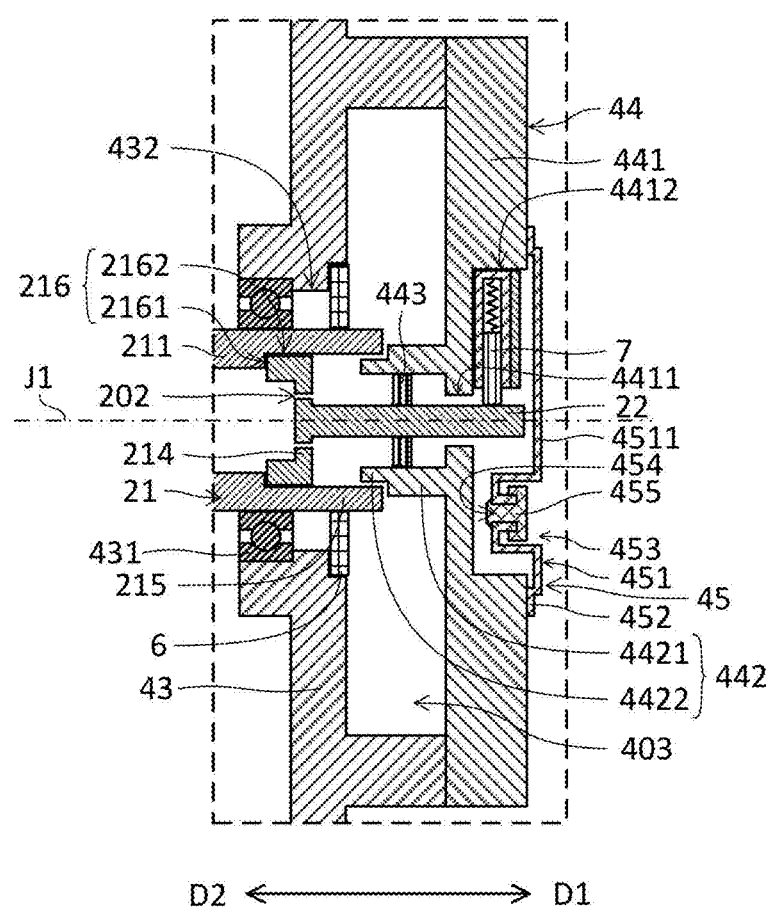
FIG. 7 is a schematic diagram illustrating another arrangement example of the first neutralizing device.

Note that the first neutralizing device 7 is separated from an inner surface of the holder recess 4412 facing radially inward in the present preferred embodiment as illustrated in FIG. 2 and the like. However, the arrangement of the first neutralizing device 7 is not limited to this example. For example, as illustrated in FIG. 7, the first neutralizing device 7 (particularly, a radially outer end portion thereof) may contact the inner surface of the holder recess 4412 facing radially inward. Then, the contact area between the first neutralizing device 7 and the neutralizing device holder 44 can be further increased. Therefore, the electrical conductivity between the both can be improved. In addition, the first neutralizing device 7 can also be fitted and fixed between the shaft 2 and the inner surface of the holder recess 4412.

The seal holder 442 is arranged radially outward of the second shaft 22 and holds the seal member 443. As described above, the neutralizing device holder 44 includes the seal holder 442. The seal holder 442 has a tubular shape in the present preferred embodiment, and extends to the other axial side D2 from an end portion on the other axial side D2 of the plate portion 441. The opening 4411 is arranged radially inward of the seal holder 442 when viewed from the axial direction.

Preferably, an end portion on the other axial side D2 of the seal holder 442 is accommodated inside the first shaft 21. Then, the neutralizing device holder 44 can be brought closer to the end portion on the one axial side D1 of the first shaft 21. Therefore, the axial sizes of the motor 1 and the drive device 100 can be reduced. In addition, the fluid F needs to flow between the first shaft 21 and the seal holder 442 before entering between the second shaft 22 and the seal holder 442. That is, the flow distance of the fluid F can be made longer, and thus, the fluid F is less likely to be applied to the first neutralizing device 7.

In addition, preferably, the peripheral wall 215 is arranged radially outward of the seal holder 442. At this time, the seal holder 442 faces the peripheral wall 215 in the radial direction and faces the end portion on the one axial side D1 of the shaft tubular portion 211 in the axial direction. Then, a path from the inside of the shaft tubular portion 211 to the outside of the shaft 2 between the seal holder 442 and the first shaft 21 can be made longer. Therefore, for example, even if the fluid F leaks from the second shaft through-hole 202 arranged in the shaft lid 214, this fluid F can hardly leak to the outside of the shaft 2 through the above-described path.

However, the above-described example does not exclude a configuration in which the end portion on the other axial side D2 of the seal holder 442 is not accommodated inside the first shaft 21. For example, the end portion on the other axial side D2 of the seal holder 442 may be separated from the end portion on the one axial side D1 of the first shaft 21 to the one axial side D1.

Preferably, the seal holder 442 includes a first protruding portion 4421 and a second protruding portion 4422. The first protruding portion 4421 protrudes from the end portion on the other axial side D2 of the plate portion 441 to the other axial side D2. The second protruding portion 4422 protrudes from an end portion on the other axial side D2 of the first protruding portion 4421 to the other axial side D2. In the present preferred embodiment, each of the first protruding portion 4421 and the second protruding portion 4422 has a tubular shape extending in the axial direction. A radially outer surface of the second protruding portion 4422 is arranged radially inward of a radially outer surface of the first protruding portion 4421. At least an end portion on the other axial side D2 of the second protruding portion 4422 is inserted through the end portion on the one axial side D1 of the first shaft 21. That is, the second protruding portion 4422 is arranged radially inward of the end portion on the one axial side D1 of the first shaft 21. The end portion on the one axial side D1 of the first shaft 21 axially faces the first protruding portion 4421 and radially faces the second protruding portion 4422. Then, a path from the inside of the first shaft 21 to the outside of the shaft 2 between the seal holder 442 and the first shaft 21 can be made longer. Therefore, for example, even if the fluid F leaks from the second shaft through-hole 202 arranged in the shaft lid 214, this fluid F can hardly leak to the outside of the shaft 2 through the above-described path.

Figure 8:
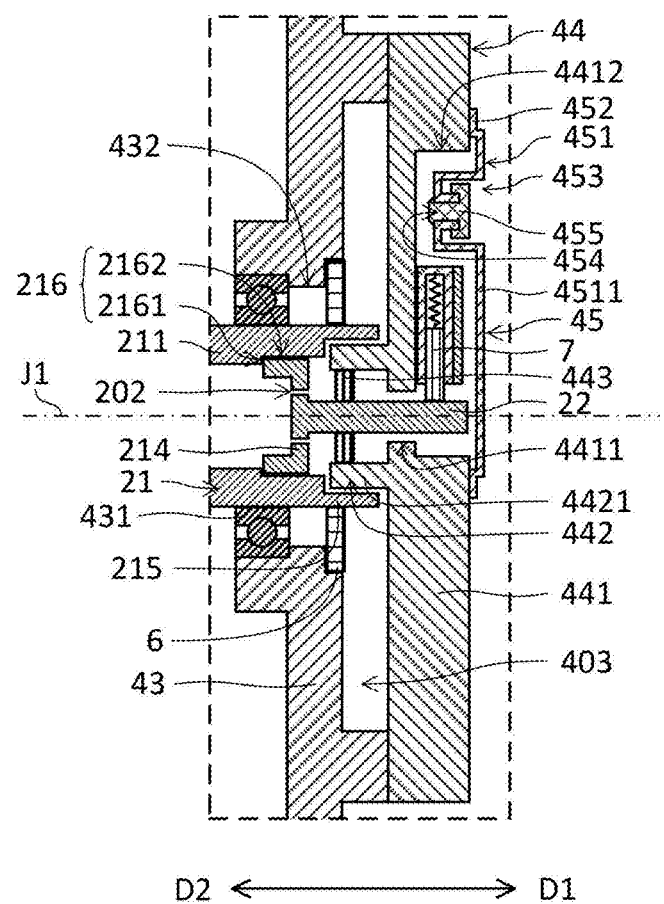
FIG. 8 is a schematic diagram illustrating another configuration example of a seal holder.

However, the above-described example does not exclude a configuration in which the seal holder 442 does not include the second protruding portion 4422. For example, as illustrated in FIG. 8, a configuration in which the seal holder 442 includes only the first protruding portion 4421 is not excluded. In this case, the first protruding portion 4421 is arranged radially inward of the end portion on the one axial side D1 of the first shaft 21. The first protruding portion 4421 axially faces the end portion on the one axial side D1 of the shaft tubular portion 211 and radially faces the peripheral wall 215.

The seal member 443 is arranged on the other axial side D2 of the neutralizing device holder 44, and isolates a space in which the first neutralizing device 7 is arranged from the fluid F. The motor 1 includes the seal member 443. The seal member 443 seals a gap between the second shaft 22 and the seal holder 442, and is arranged on the other axial side D2 with respect to the first neutralizing device 7. Then, the seal member 443 that seals the gap between the second shaft 22 and the seal holder 442 makes it difficult for the fluid, which lubricates and cools the stator 12, the bearing 431, and the like, to be applied to the first neutralizing device 7. For example, the atomized fluid F may leak to the space 403 on the one axial side D1 of the bearing holder 43 through the opening 432 of the bearing holder 43 from a gap between an inner ring and an outer ring of the ball bearing 431 or between the bearing 431 and the second shaft 22, and enter the gap between the second shaft 22 and the seal holder 442. The seal member 443 can suppress or prevent the flow of this fluid F by sealing the gap between the second shaft 22 and the seal holder 442. That is, the fluid F hardly flows to the one axial side D1 of the seal member 443. In addition, for example, the fluid F hardly leaks to the one axial side D1 of the neutralizing device holder 44. Therefore, it is possible to suppress or prevent the fluid F from being applied to the first neutralizing device 7. Therefore, the motor 1 and the drive device 100 can favorably maintain the electrical connection between the second shaft 22 and the housing 4.

As the seal member 443, for example, a slinger can be used. For example, the seal member 443 includes a fixed portion (not illustrated) and a flange portion (not illustrated). The fixed portion is fixed to the radially outer surface of the second shaft 22. The flange portion expands radially outward from the fixed portion.

Alternatively, the fixed portion may be conversely fixed to a radially inner surface of the seal holder 442. At this time, the flange portion expands radially inward from the fixed portion. The flange portion seals the gap between the second shaft 22 and the seal holder 442. However, the seal member 443 is not limited to this example. As the seal member 443, an oil seal, a mechanical seal, a packing, or the like may be used.

The cover member 45 is arranged at the end portion on the one axial side D1 of the neutralizing device holder 44. As described above, the housing 4 includes the cover member 45. The cover member 45 covers the opening 432 of the neutralizing device holder 44 and the first neutralizing device 7. The cover member 45 can be attached to the neutralizing device holder 44 by, for example, screwing, but is not limited thereto.

The cover member 45 includes a first cover portion 451 and a second cover portion 452. The first cover portion 451 is arranged on the one axial side D1 with respect to the opening 432 and the first neutralizing device 7, and covers the opening 432 and the first neutralizing device 7. The first cover portion 451 includes a plate 4511. In other words, the cover member 45 includes the plate 4511. The plate 4511 expands in a direction intersecting the rotation axis J1. The second cover portion 452 is arranged radially outward of the first cover portion 451 on the other axial side D2. A radially inner end portion of the second cover portion 452 is connected to a radially outer end portion of the first cover portion 451, and a radially outer end portion of the second cover portion 452 is connected to an end surface on the one axial side D1 of the neutralizing device holder 44.

In addition, the cover member 45 further includes a cover recess 453. The cover recess 453 is recessed from the plate 4511 to the other axial side D2.

In addition, the cover member 45 further includes a through-hole 454. The through-hole 454 connects a space surrounded by the neutralizing device holder 44 and the cover member 45 to the outside thereof. The number of the through-holes 454 may be one or plural as illustrated in FIG. 2. The through-hole 454 is arranged in the first cover portion 451 in FIG. 2. However, the arrangement of the through-hole 454 is not limited to the example of FIG. 2. The through-hole 454 can be arranged in at least one of the first cover portion 451 and the second cover portion 452. Alternatively, the through-hole 454 may be arranged in the neutralizing device holder 44. That is, the through-hole 454 may be arranged in at least one of the neutralizing device holder 44 and the cover member 45. Then, the space between the neutralizing device holder 44 and the cover member 45 can communicate with the outside of the space through the through-hole 454. For this reason, it is possible to prevent a change in internal pressure of the space caused by a temperature change or the like and to eliminate a pressure difference between the inside and the outside of the space. For example, it is possible to prevent generation of a pressure difference between the one axial side D1 and the other axial side D2 with respect to the seal member 443, and thus, it is possible to prevent the fluid F from entering the space between the neutralizing device holder 44 and the cover member 45 due to pressure reduction.

In addition, the cover member 45 further includes a filter 455. The filter 455 covers the through-hole 454. The housing 4 has the filter 455. The space between the neutralizing device holder 44 and the cover member 45 is connected to the outside through the through-hole 454 and the filter 455. Preferably, at least one through-hole 454 is arranged in the cover recess 453. As the through-hole 454 is covered with the filter 455, even if the wear debris is generated in the first neutralizing device 7, the wear debris can be prevented from flying out to the outside through the through-hole 454. More preferably, the filter 455 covering the through-hole 454 of the cover recess 453 is arranged on the other axial side D2 of the plate 4511. Then, it is unnecessary to secure a space for arranging the filter 455 on the one axial side D1 of the plate 4511. Therefore, it is possible to prevent an increase in the axial sizes of the motor 1 and the drive device 100 caused by the arrangement of the filter 455.

In the present preferred embodiment, the first neutralizing device 7 is arranged between the through-hole 454 and the filter 455, and the second shaft 22 when viewed from the axial direction. The through-hole 454 and the filter 455 are arranged radially outward of the first neutralizing device 7. The second shaft 22 is arranged radially inward of the first neutralizing device 7. That is, the through-hole 454 and the filter 455 are arranged on the opposite side of the second shaft 22 with the first neutralizing device 7 interposed therebetween. In other words, at least a part of the filter 455 overlaps the first neutralizing device 7 when viewed from the radial direction. Then, the filter 455 and the plate 4511 of the cover member 45 can be arranged on the other axial side D2. Therefore, the axial sizes of the motor 1 and the drive device 100 can be further reduced.

However, the arrangement of the through-hole 454 and the filter 455 is not limited to this example. In addition, at least a part of the filter 455 does not necessarily overlap the first neutralizing device 7 when viewed from the radial direction. The through-hole 454 and the filter 455 may be arranged on the opposite side of the first neutralizing device 7 with the second shaft 22 interposed therebetween when viewed in the axial direction (see FIG. 7, for example).

The gear lid 46 is attached to the other axial side D2 of the side plate 42. In the present preferred embodiment, the gear lid 46 has a plate portion (whose reference sign is omitted) and a tubular portion (whose reference sign is omitted). The plate portion expands in a direction intersecting the rotation axis J1. The tubular portion has a tubular shape extending to the one axial side D1 from an end portion on the one axial side D1 of the plate portion. An end portion on the one axial side D1 of the tubular portion is connected to the side plate 42 and covered by the side plate 42. The plate portion and the tubular portion form the transmission device accommodation space 402, which allows the power transmission device 3 to be arranged therein, together with the side plate 42. The gear lid 46 can be attached to the side plate 42 by, for example, fixing with a screw. However, the present invention is not limited to this example, and methods, such as screwing and press-fitting, by which the gear lid 46 can be firmly fixed to the side plate 42 can be widely adopted. As a result, the gear lid 46 can be brought into close contact with an end portion on the one axial side D1 of the side plate 42.

The gear lid 46 includes a second drive shaft through-hole 460. The center of the second drive shaft through-hole 460 coincides with a differential axis J3 parallel to the rotation axis J1. The other drive shaft Ds2 of the drive shaft Ds is inserted through the second drive shaft through-hole 460. A seal portion (not illustrated) such as an oil seal is arranged in a gap between the drive shaft Ds2 and the second drive shaft through-hole 460.

In addition, the gear lid 46 further includes bearing holding portions 461, 462, and 463. The bearing holding portions 461, 462, and 463 are arranged on an end surface on the other axial side D2 of the gear lid 46 in the transmission device accommodation space 402. The bearing holding portion 461 holds the bearing 4611. The bearing holding portion 462 holds the second intermediate bearing 4621. The bearing holding portion 463 is arranged along an outer edge of an end portion on the other axial side D2 of the second drive shaft through-hole 460 and holds a second output bearing 4631.

In addition, the gear lid 46 includes a tray portion 464 and the oil passage 465. The tray portion 464 is arranged in an end surface on the one axial side D1 of the gear lid 46 and has a recess recessed vertically downward. The tray portion 464 can store the fluid F scraped up by the ring gear 321. The oil passage 465 is a passage for the fluid F and connects the tray portion 464 and the inlet 213 of the shaft 2. The fluid F stored in the tray portion 464 is supplied to the oil passage 465 and flows into the hollow portion 212 from the inlet 213 at the end portion on the other axial side D2 of the shaft 2.

The fluid circulation portion 5 supplies the fluid F stored in the housing 4 to the stator 12, the bearings 4211 and 431, and the like. The fluid circulation portion 5 includes a pipe portion 51, a pump 52, a cooler 53, and a reservoir 54.

The pipe portion 51 connects the pump 52 and the reservoir 54, and supplies the fluid F to the reservoir 54. The pump 52 sucks the fluid F stored in a lower region of the transmission device accommodation space 402. The pump 52 is an electric pump, but is not limited thereto. For example, the pump 52 may be configured to be driven by utilizing a part of the power of the shaft 2 of the drive device 100.

The cooler 53 is arranged between the pump 52 of the pipe portion 51 and the reservoir 54. That is, the fluid F sucked by the pump 52 passes through the cooler 53 through the pipe portion 51, and then, is sent to the reservoir 54. For example, a refrigerant such as water supplied from the outside is supplied to the cooler 53. The cooler 53 exchanges heat between the refrigerant and the fluid F to lower the temperature of the fluid F.

The reservoir 54 is a tray capable of storing the fluid F, and is accommodated in the motor accommodation space 401, which will be described later, of the housing 4. The reservoir 54 is arranged vertically above the stator 12 inside the motor accommodation space 401. A dropping hole 540 is formed at a bottom of the reservoir 54, and the motor 1 is cooled by dropping the fluid F from the dropping hole 540. The dropping hole 540 is formed, for example, at an upper portion of the coil end 1221 of the coil portion 122 of the stator 12, and the coil portion 122 is cooled by the fluid F.

In addition, the rotation detector 6 detects a rotation angle of the shaft 2. In the present preferred embodiment, the rotation detector 6 is a resolver including a resolver rotor and a resolver stator. The rotation detector 6 includes the resolver rotor (not illustrated) fixed to the shaft 2 and the resolver stator (not illustrated) fixed to the one axial side of the bearing holder 43 of the housing 4. The resolver rotor and the resolver stator have an annular shape. An inner peripheral surface of the resolver stator radially faces an outer peripheral surface of the resolver rotor. The resolver stator periodically detects a rotation angle position of the resolver rotor when the rotor 11 rotates. As a result, the rotation detector 6 acquires information on the rotation angle position of the rotor 11. Note that the present invention is not limited to the example of the present preferred embodiment, and the rotation detector 6 is not necessarily the resolver, and may be, for example, a rotary encoder or the like.

The rotation detector 6 is arranged in the space 403 surrounded by the bearing holder 43 and the neutralizing device holder 44. Then, the space for arranging the rotation detector 6 on the one axial side D1 of the neutralizing device holder 44 is not necessarily secured. Therefore, it is possible to suppress the increase in the axial sizes of the motor 1 and the drive device 100.

Next, a configuration of the first neutralizing device 7 will be described with reference to FIGS. 5A and 5B. The first neutralizing device 7 is fixed to the housing 4 and contacts the shaft 2. The first neutralizing device 7 electrically connects the shaft 2 and the housing 4. In the present preferred embodiment, the first neutralizing device 7 is arranged on the one axial side D1 of the neutralizing device holder 44 and contacts the radially outer surface of the second shaft 22.

As illustrated in FIG. 5A (and FIG. 2), the first neutralizing device 7 of the present preferred embodiment includes a conductive member 71, an elastic member 72, a holding member 73, and a fixing member 74.

The conductive member 71 is formed using a material having conductivity. A tip end of the conductive member 71 contacts the second shaft 22. The conductive member 71 is a molded body in the present preferred embodiment, but is not limited to this example, and may have a brush shape in which carbon fibers or the like are bundled. As the material of the conductive member 71, a material having good slidability is preferably used, and a material having a low friction coefficient is more preferably used. As the material of the conductive member 71, for example, a composite resin containing a conductive filler such as a carbon fiber or metal can be adopted.

The elastic member 72 is accommodated inside the holding member 73 in a compressed state. Due to the elasticity, the elastic member 72 pushes the conductive member 71 toward the second shaft 22. In the present preferred embodiment, a spring coil is used as the elastic member 72, but the present invention is not limited to this example, and a member in another form such as a leaf spring or rubber may be used.

The holding member 73 has a bottomed tubular shape, and accommodates a part of the conductive member 71 and the elastic member 72 therein. The holding member 73 holds the conductive member 71. Specifically, the holding member 73 holds an end portion of the conductive member 71 on the elastic member 72 side so as to be movable in a direction in which the holding member 73 extends. In addition, the holding member 73 holds the elastic member 72 so as to be stretchable in the direction in which the holding member 73 extends.

The fixing member 74 fixes the first neutralizing device 7 to the housing 4. In the present preferred embodiment, the fixing member 74 fixes the first neutralizing device 7 to the neutralizing device holder 44 (see FIG. 5A, for example). However, the present invention is not limited to this example, and the fixing member 74 may fix the first neutralizing device 7 to the cover member 45. That is, the fixing member 74 can fix the first neutralizing device 7 to at least one of the neutralizing device holder 44 and the cover member 45.

In addition, the fixing member 74 has conductivity and is electrically connected to the conductive member 71. When the fixing member 74 is fixed to the neutralizing device holder 44 or the cover member 45 having conductivity, the conductive member 71 is electrically connected to the housing 4.

In the present preferred embodiment, (the conductive member 71 of) the first neutralizing device 7 contacts a partial region in the circumferential direction of the radially outer surface of the second shaft as illustrated in FIG. 5A. However, the present invention is not limited to this example, and (the conductive member 71 of) the first neutralizing device 7 may contact the entire region in the circumferential direction of the radially outer surface of the second shaft 22 as illustrated in FIG. 5B. That is, it is sufficient for (the conductive member 71 of) the first neutralizing device 7 to contact at least a partial region in the circumferential direction of the radially outer surface of the second shaft 22. Since the first neutralizing device 7 contacts at least a partial region in the circumferential direction of the radially outer surface of the second shaft 22 having a smaller outer diameter than the first shaft 21, it is possible to further reduce the sliding area of the first neutralizing device 7 with respect to the second shaft 22 per rotation of the shaft 2. Therefore, it is possible to reduce the wear debris generated at the contact portion between the first neutralizing device 7 and the shaft 2.

Figure 9:
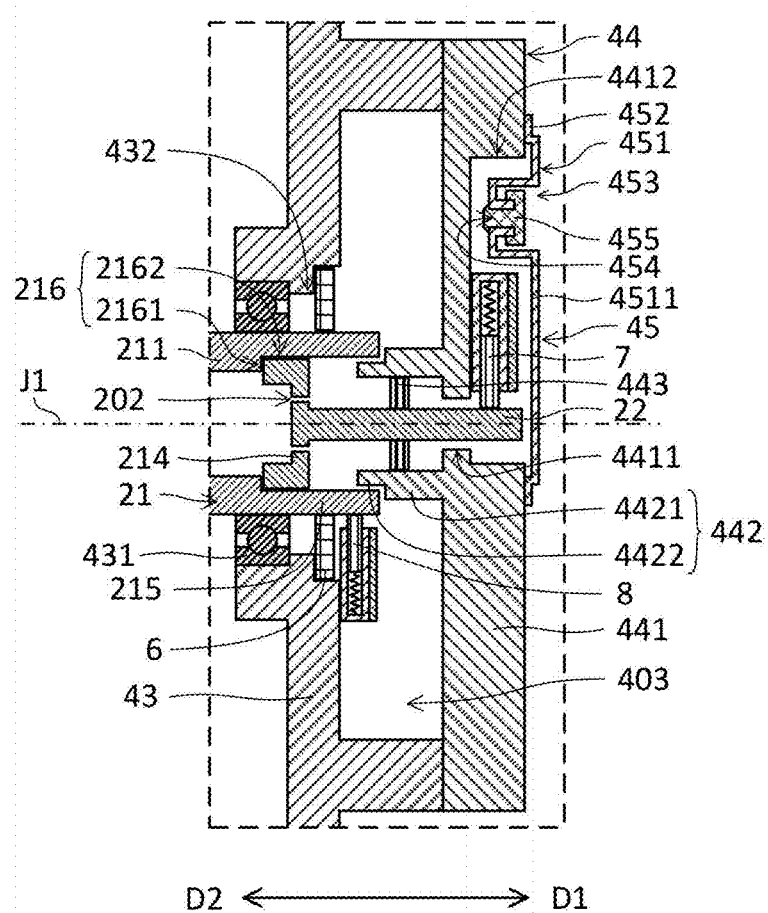
FIG. 9 is a conceptual diagram illustrating an enlarged configuration example of main parts of a drive device according to a first modification.
Figure 10:
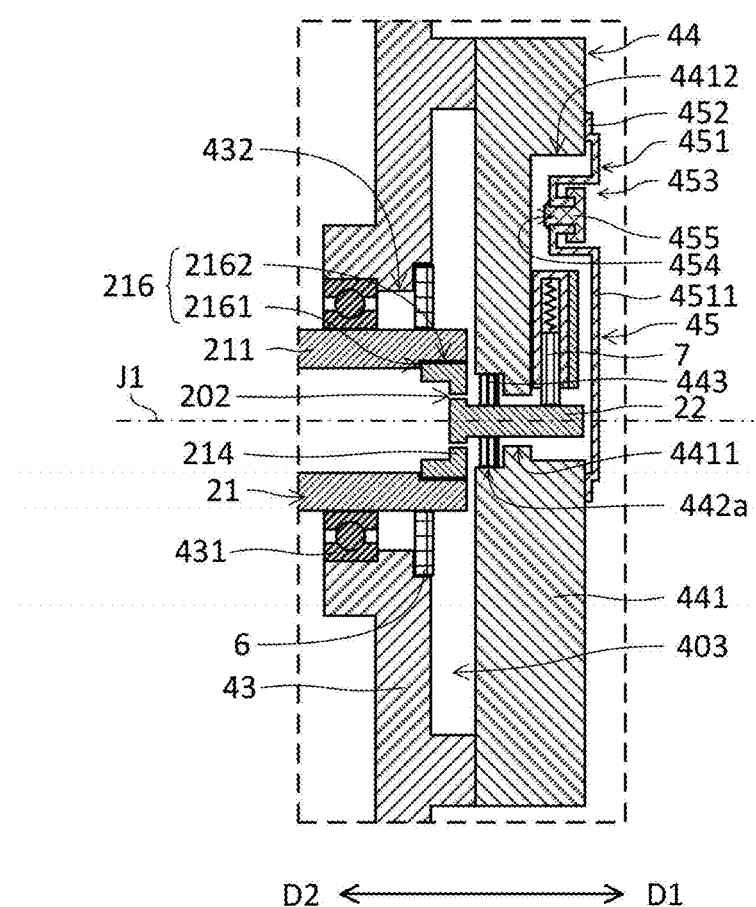
FIG. 10 is a conceptual diagram illustrating an enlarged configuration example of main parts of a drive device according to a second modification.
Figure 11:
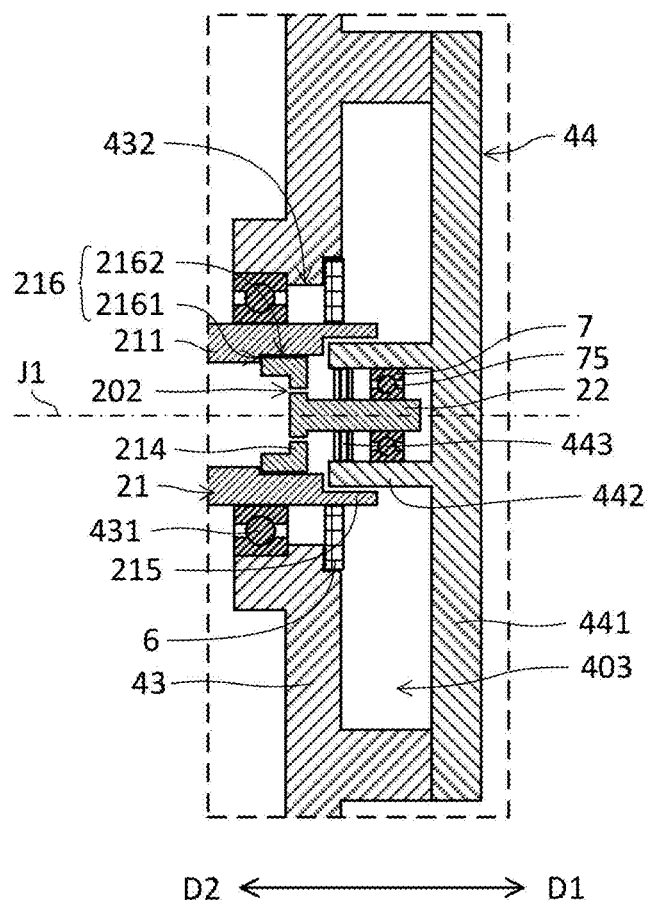
FIG. 11 is a conceptual diagram illustrating an enlarged configuration example of main parts of a drive device according to a third modification.

Next, a first modification to a third modification of the preferred embodiment will be described with reference to FIGS. 9 to 11. FIG. 9 is a conceptual diagram illustrating an enlarged configuration example of main parts of the drive device 100 according to the first modification. FIG. 10 is a conceptual diagram illustrating an enlarged configuration example of main parts of the drive device 100 according to the second modification. FIG. 11 is a conceptual diagram illustrating an enlarged configuration example of main parts of the drive device 100 according to the third modification. Note that FIGS. 9 to 11 are merely conceptual diagrams, and a layout and dimensions of each portion are not necessarily identical to those of the actual drive device 100. In addition, each of FIGS. 9 to 11 corresponds to the portion II surrounded by the broken line in FIG. 1.

Note that the above-described preferred embodiment and the first to third modifications can be appropriately combined and implemented as long as there is no particular contradiction.

The first modification will be described with reference to FIG. 9. Note that a configuration of the first modification different from that of the above-described preferred embodiment will be described hereinafter. In addition, the same components as those in the above-described preferred embodiment are denoted by the same reference signs, and the description thereof may be omitted.

In the first modification, the motor 1 further includes a second neutralizing device 8. The second neutralizing device 8 electrically connects the first shaft 21 and the housing 4. Then, the current generated by potential fluctuations occurring in the shaft 2 can be discharged to the housing 4 through the second neutralizing device 8. Therefore, the efficiency of eliminating the static electricity of the shaft 2 can be further improved.

The second neutralizing device 8 is fixed to the one axial side D1 of the bearing holder 43. The second neutralizing device 8 is arranged on the other axial side D2 with respect to the end portion on the one axial side D1 of the first shaft 21. In FIG. 9, the second neutralizing device 8 contacts a partial region in the circumferential direction of the radially outer surface of the first shaft 21. However, the present invention is not limited to this example, and the second neutralizing device 8 may contact the entire region in the circumferential direction of the radially outer surface of the first shaft 21. Then, it is unnecessary to secure a space for arranging the second neutralizing device 8 on the one axial side D1 of the first shaft 21. Therefore, it is possible to suppress the increase in the axial sizes of the motor 1 and the drive device 100. This contributes to downsizing of the motor 1 and the drive device 100.

The configuration of the second neutralizing device 8 is the same as that of the first neutralizing device 7 in the present preferred embodiment, but is not limited to this example, and may be different from that of the first neutralizing device 7.

Next, the second modification will be described with reference to FIG. 10. Note that a configuration of the second modification different from those of the above-described preferred embodiment and first modification will be described hereinafter. In addition, the same components as those in the above-described preferred embodiment and first modification are denoted by the same reference signs, and the description thereof may be omitted.

In the second modification, a seal holder 442a is a recess arranged on the other axial side D2 of the neutralizing device holder 44, and is recessed to the one axial side. In addition, the seal holder 442a is separated from the end portion on the one axial side D1 of the first shaft 21 to the one axial side D1. The seal member 443 is arranged on an inner surface of the seal holder 442a facing radially inward.

For this reason, the first shaft 21 does not include the peripheral wall 215, and the end portion on the one axial side D1 of the shaft tubular portion 211 is the end portion on the one axial side D1 of the first shaft 21. In addition, the shaft lid 214 is arranged at the end portion on the one axial side D1 of the first shaft 21.

According to the second modification, it is possible to further narrow an interval in the axial direction between the end portion on the one axial side D1 of the first shaft 21 and the neutralizing device holder 44. Therefore, the axial sizes of the motor 1 and the drive device 100 can be reduced more.

Next, the third modification will be described with reference to FIG. 11. Note that a configuration of the third modification different from those of the above-described preferred embodiment, first modification, and second modification will be described hereinafter. In addition, the same components as those in the above-described preferred embodiment, first modification, and second modification are denoted by the same reference signs, and the description thereof may be omitted.

In the third modification, the first neutralizing device 7 is arranged on the one axial side D1 of the seal member 443 between the second shaft 22 and the seal holder 442. Even in this case, it is possible to more reliably suppress or prevent the fluid F from being applied to the first neutralizing device 7.

In the third modification, the first neutralizing device 7 is arranged on the other axial side D2 of the neutralizing device holder 44. For this reason, the end portion on the one axial side D1 of the second shaft 22 can be arranged on the other axial side D2 of the plate portion 441. In addition, the opening 4411 and the holder recess 4412 are not necessarily arranged in the plate portion 441 of the neutralizing device holder 44 as illustrated in FIG. 11. In addition, the cover member 45 can also be omitted since the opening 4411 is omitted. Then, the number of components of the housing 4 can be reduced, and the neutralizing device holder 44 can have a simpler configuration. In addition, the arrangement of members on the one axial side D1 of the neutralizing device holder 44 can be omitted, and thus, the axial sizes of the motor 1 and the drive device 100 can be reduced.

In addition, the first neutralizing device 7 is a conductive bearing lubricated by a lubricant 75 having a higher electrical conductivity than the fluid F in the third modification. In the present preferred embodiment, conductive grease is used as the lubricant 75. In the conductive grease, a conductive material such as copper powder or carbon powder is added to a lubricating oil such as grease. In the first neutralizing device 7, the second shaft 22 and the neutralizing device holder 44 can be electrically connected by the lubricant 75. In FIG. 11, the first neutralizing device 7 is a ball bearing lubricated with the lubricant 75. An inner ring of the first neutralizing device 7 is fixed to the radially outer surface of the second shaft 22, and an outer ring of the first neutralizing device 7 is fixed to the radially inner surface of the seal holder 442. In this case, the inner ring and the outer ring of the first neutralizing device 7 are electrically connected by the lubricant 75, and thus, the second shaft 22 is electrically connected to the seal holder 442 of the neutralizing device holder 44.

In addition, the first neutralizing device 7 is arranged to be coaxial with the bearing 431. For example, the both have an annular shape centered on the same axis (that is, the rotation axis J1). Then, the first neutralizing device 7 can rotatably support the shaft 2 more stably together with the bearing 431.

Note that the example of FIG. 11 does not exclude a configuration in which the first neutralizing device 7 is not a conductive bearing. In addition, the first neutralizing device 7 contacts the entire region in the circumferential direction of the radially outer surface of the second shaft 22 in the third modification, but is not limited to this example, and may contact a partial region in the circumferential direction of the radially outer surface of the second shaft 22. In addition, the first neutralizing device 7 may be fixed to one of the second shaft 22 and the seal holder 442 or may contact the other. For example, the first neutralizing device 7 may have the configuration as illustrated in FIG. 5A or 5B.

The preferred embodiment of the present invention has been described above. Note that the scope of the present invention is not limited to the above-described preferred embodiment. The present invention can be implemented by making various modifications to the above-described preferred embodiment within a range not departing from the gist of the invention. In addition, the matters described in the above-described preferred embodiment can be arbitrarily combined together as appropriate within a range where no inconsistency occurs.

The present invention is useful for a device that grounds a shaft.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor, comprising:
a shaft including a first shaft axially extending along a rotation axis;
a rotor that is fixed to the shaft, and is rotatable about the rotation axis;
a stator radially facing the rotor with a gap between the stator and the rotor;
a bearing rotatably supporting the shaft;
a housing accommodating the rotor, the stator, and the bearing;
a first neutralizing device; and
a seal member,
wherein the shaft further includes a second shaft extending from the first shaft to one axial side,
the housing includes:
a bearing holder that has an opening through which the first shaft is inserted, and holds the bearing; and
a neutralizing device holder that holds the first neutralizing device, and covers at least a part of the opening,
the neutralizing device holder includes a seal holder that is arranged radially outward of the second shaft, and holds the seal member,
the first neutralizing device electrically connects the second shaft and the neutralizing device holder,
the seal member seals a gap between the second shaft and the seal holder, and is arranged on another axial side of the first neutralizing device,
the first shaft includes:
a shaft tubular portion that axially extends and has a tubular shape surrounding the rotation axis, and
a shaft lid arranged on the one axial side of the shaft tubular portion,
the shaft further includes:
a first shaft through-hole radially penetrating the first shaft, and
a second shaft through-hole that causes a space, surrounded by the shaft tubular portion and the shaft lid, to communicate with an outside of the shaft, and
the second shaft through-hole is arranged on the one axial side of the first shaft through-hole and radially outward of the second shaft.

2. The motor according to claim 1, wherein
the first neutralizing device is arranged on either the one axial side of the neutralizing device holder or the one axial side of the seal member between the second shaft and the seal holder.

3. The motor according to claim 1, wherein
an outer diameter of the second shaft is smaller than an outer diameter of the first shaft, and
the first neutralizing device contacts at least a partial region in a circumferential direction of a radially outer surface of the second shaft.

4. The motor according to claim 1, wherein another axial end portion of the seal holder is accommodated inside the first shaft.

5. The motor according to claim 1, wherein
the second shaft extends to the one axial side from the shaft lid, and
at least a part of the second shaft through-hole penetrates the shaft lid.

6. The motor according to claim 5, wherein
the first shaft further includes a peripheral wall protruding from one axial end portion of the shaft tubular portion to the one axial side,
the peripheral wall is arranged radially outward of the seal holder, and
the seal holder radially faces to the peripheral wall and axially faces the one axial end portion of the shaft tubular portion.

7. The motor according to claim 1, wherein
the first shaft further includes a step to which the shaft lid is fitted, and
the step has:
a first facing surface axially facing another axial end portion of the shaft lid; and
a second facing surface that expands from a radially outer end portion of the first facing surface to the one axial side, and radially faces a radially outer end portion of the shaft lid.

8. The motor according to claim 1, further comprising:
a rotation detector that detects a rotation angle of the shaft, wherein the rotation detector is arranged in a space surrounded by the bearing holder and the neutralizing device holder.

9. The motor according to claim 1, further comprising: a second neutralizing device that electrically connects the first shaft and the housing.

10. The motor according to claim 9, wherein the second neutralizing device is arranged on the another axial side of one axial end portion of the first shaft.

11. The motor according to claim 1, wherein the first neutralizing device is arranged on the one axial side of the neutralizing device holder,
the neutralizing device holder further includes a holder recess recessed to the other axial side, and
at least a part of the first neutralizing device is accommodated in the holder recess.

12. The motor according to claim 11, wherein a radially outer end portion of the first neutralizing device contacts an inner surface of the holder recess, the inner surface facing radially inward.

13. A drive device comprising:
the motor according to claim 1; and
a power transmission device that transmits power of the motor to a drive shaft.

14. A motor according to claim 1, comprising:
a shaft including a first shaft axially extending along a rotation axis;
a rotor that is fixed to the shaft, and is rotatable about the rotation axis;
a stator radially facing the rotor with a gap between the stator and the rotor;
a bearing rotatably supporting the shaft;
a housing accommodating the rotor, the stator, and the bearing;
a first neutralizing device; and
a seal member,
wherein the shaft further includes a second shaft extending from the first shaft to one axial side,
the housing includes:
a bearing holder that has an opening through which the first shaft is inserted, and holds the bearing; and
a neutralizing device holder that holds the first neutralizing device, and covers at least a part of the opening,
the neutralizing device holder includes a seal holder that is arranged radially outward of the second shaft, and holds the seal member,
the first neutralizing device electrically connects the second shaft and the neutralizing device holder,
the seal member seals a gap between the second shaft and the seal holder, and is arranged on another axial side of the first neutralizing device,
the neutralizing device holder further includes a plate portion expanding in a direction intersecting the rotation axis,
the seal holder includes:
a first protruding portion protruding from another axial end portion of the plate portion to the another axial side; and
a second protruding portion protruding from another axial end portion of the first protruding portion to the another axial side, the second protruding portion is arranged radially inward of one axial end portion of the first shaft, and
the one axial end portion of the first shaft axially faces the first protruding portion and radially faces the second protruding portion.

15. A motor, comprising:
a shaft including a first shaft axially extending along a rotation axis;
a rotor that is fixed to the shaft, and is rotatable about the rotation axis;
a stator radially facing the rotor with a gap between the stator and the rotor;
a bearing rotatably supporting the shaft;
a housing accommodating the rotor, the stator, and the bearing;
a first neutralizing device; and
a seal member,
wherein the shaft further includes a second shaft extending from the first shaft to one axial side,
the housing includes:
a bearing holder that has an opening through which the first shaft is inserted, and holds the bearing; and
a neutralizing device holder that holds the first neutralizing device, and covers at least a part of the opening,
the neutralizing device holder includes a seal holder that is arranged radially outward of the second shaft, and holds the seal member,
the first neutralizing device electrically connects the second shaft and the neutralizing device holder,
the seal member seals a gap between the second shaft and the seal holder, and is arranged on another axial side of the first neutralizing device,
the housing further includes a cover member that is arranged at one axial end portion of the neutralizing device holder and covers the first neutralizing device and the opening,
through-holes are arranged in at least one of the neutralizing device holder and the cover member,
the housing further includes a filter that covers a through-hole of the through-holes,
a space between the neutralizing device holder and the cover member is connected to an outside through the through-holes and the filter,
the cover member includes:
a plate expanding in a direction intersecting the rotation axis; and
a cover recess recessed from the plate to the another axial side,
at least one of the through-holes is arranged in the cover recess, and
the filter covering the through-hole of the cover recess is arranged on the another axial side of the plate.

16. The motor according to claim 15, wherein the first neutralizing device is arranged on the one axial side of the neutralizing device holder, and
at least a part of the filter overlaps the first neutralizing device when radially viewed.

* * * * *